United States Patent Office 3,417,010
Patented Dec. 17, 1968

3,417,010
WAX CRYSTAL MODIFIER COMPOSITION
Richard O. Henselman, North Plainfield, and Norman Jacobson, East Brunswick, N.J., assignors to Esso Research and Engineering Company, a corporation of Delaware
No Drawing. Filed May 27, 1966, Ser. No. 553,279
9 Claims. (Cl. 208—28)

ABSTRACT OF THE DISCLOSURE

A dewaxing mixture of a combination of (a) a Friedel-Crafts condensation product of a halogenated paraffin with an aromatic hydrocarbon and (b) an oil soluble poymer of a 1,2-epoxy alkane.

---

This invention relates to a novel wax crystal modifier composition and to the utilization of same, and more particularly to a dewaxing aid comprising a combination of additives which synergistically improve the separation of waxes from petroleum oils.

Various methods are known in the art for separating wax from petroleum oil. One such method, for instance, is chilling the waxy oil and filtering off the solid wax. One of the most popular ways of dewaxing oils is known as solvent dewaxing. This comprises diluting the oil with a solvent, heating until complete solution is obtained, and then chilling until the desired amount of wax has crystallized out. The wax crystals thus formed are separated from the slurry by means of filtration. The wax is then further purified, while the solvent is recovered for reuse and the dewaxed oil is sent to other refinery processes.

Although such solvent dewaxing has largely replaced other processes for the separation of wax from hydrocarbon oils, filtration of the wax crystals from the slurry formed during dewaxing is difficult and often the filtration rate of the slurry limits the capacity of the entire process. The slurry filtration rate is determined primarily by the size and shape of the wax crystals formed during the chilling step of the process. Vary fine crystals tend to clog the filter media rapidly, reducing the filtration rate and eventually necessitating shutdown of the filters for removal of the accumulated wax. Very large crystals tend to form gel-like interlocking masses which do not form a compact filter cake, which contain a large amount of oil and solvent, and which are difficult to wash. As a solution to this problem, it has become the practice in the art to incorporate in the wax-containing petroleum oil materials which modify the size and shape of wax crystals in such a manner as to permit more rapid separation of the wax during dewaxing operations. These materials are known as dewaxing aids. For example, it has been known for some time that Friedel-Crafts condensation products of halogenated paraffins and aromatic hydrocarbons are effective dewaxing aids for waxing-containing petroleum oils. However, the continued need for more efficient petroleum dewaxing processes has raised the requirements of dewaxing and filtering aids. The provision of new and more efficient dewaxing aids is, therefore, of great importance to the petroleum art.

It has now been found, in accordance with this invention, that by incorporating in a petroleum oil, as dewaxing aids, the combination of (a) a conventional wax crystal modifier made by the Friedel-Crafts reaction, i.e., a condensation product of a halogenated paraffin with an aromatic hydrocarbon and (b) a polymer of a $C_{12}$–$C_{50}$ alkylethylene oxide, a synergistic improvement in the wax crystal characteristics of the oil over that provided by the corporation of either of these two types of additives alone is obtained. It is, therefore, the primary object of this invention to provide a new and highly improved class of wax crystal modifier compositions. Other and further objects of the invention will become apparent from the following detailed description thereof.

The present invention contemplates the employment of any conventional wax crystal modifier (e.g., pour depressant, dewaxing aid, etc.) made by the Friedel-Crafts condensation of a halogenated paraffin with an aromatic hydrocarbon. The halogenated paraffin may, for example, contain from about 8 to about 30 carbon atoms, preferably from about 16 to about 22, and from about 5 to about 25 wt. percent chlorine, preferably from about 10 to about 18 wt. percent. Typically, the halogenated paraffins used to prepare this well known class of wax modifiers are themselves prepared by chlorinating to the above recited chlorine content a paraffin wax having a melting point within the range between about 120° and 190° F. The aromatic hydrocarbon used herein contains a maximum of three substituent groups and/or condensed rings and may be a hydroxy compound such as phenol, cresol, xylenol, or an amine such as aniline, but is preferably naphthalene, phenanthrene or anthracene. The Friedel-Crafts condensation products of the instant invetnion are prepared in accordance with well known techniques, e.g., British Patents 511,207 and 562,714.

The second general component of this invention comprises a polymer obtained from $C_{14}$–$C_{50}$ epoxy alkanes. In general, these polymers may be represented by the following generic formula:

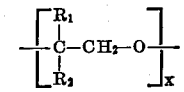

wherein X is an integer from 2 to 100 or higher, the upper limit being based on oil solubility, $R_1$ is a lower alkyl (e.g., a $C_1$–$C_4$ alkyl, such as, methyl, ethyl and butyl) or hydrogen, preferably the latter and $R_2$ is a hydrocarbon radical containing a substantially linear alkyl of at least 12 carbon atoms. In essence, $R_2$ may be branched or unbranched and may contain cyclic structures but there should be a linear alkyl chain containing at least 12 carbon atoms, e.g., $R_2$ may be a phenyl group containing a $C_{20}$ alkyl substituent in the para position. It is preferred, however, that $R_2$ be a linear alkyl containing from 16 to 26 carbon atoms, although alkyls containing up to 50 carbon atoms are suitable.

The epoxy alkanes used in preparing the aforedescribed polyalkylethylene oxide are selected from a wide group of 1,2-epoxy compounds known and used in organic synthesis. The epoxy alkanes are prepared by means well known in the art, e.g., by reaction of an unsaturated aliphatic hydrocarbon, having its double bond between the terminal carbon atoms of the chain, with hypochlorous acid, or an organic peroxide (e.g., m-chloroperbenzoic acid, trifluoroperacetic acid etc.) to form an epoxide. In the reaction with hypochlorous acid, the chlorohydrin derivative is formed in the first step and is transformed to the epoxide by dehydrochlorination with an alkali such as sodium hydroxide. In each reaction, the result is the placement of a single oxygen atom across the double carbon atom bond. Specific examples of suitable epoxides include 1,2-tetradecene oxide; 1,2-hexadecene oxide; 1,2-octadecene oxide; 3-ethyl-1,2-octadecene oxide; 1,2-eicosene oxide; 1,2-docosene oxide; 3-methyl-1,2-docosene oxide; 1,2-tetracosene oxide; 1,2-octacosene oxide; 1,2-triacotene oxide; 4-ethyl-1,2-triacotene oxide; 1,2-tetracotene oxide and mixtures thereof.

The alkylethylene oxide polymers of this invention are prepared in accordance with well known techniques. For example, the epoxy alkane may be dissolved in a suitable solvent and subsequently contacted with a Lewis acid catalyst at a temperature within the range between about −30° to about 40° C. for a period of a few minutes to several hours or more. The polymerization is generally conducted in the presence of a suitable inert solvent such as, for example, methylene chloride, ethylene dichloride, chloroform, benzene, toluene, xylene, cyclohexane, normal heptane, ethyl ether, dioxane and the like. The Lewis acid catalyst may be any of this well-known type of catalyst such as boron trifluoride etherate, aluminum chloride, antimony pentachloride, phosphorus pentachloride, phosphorus pentafluoride and the like.

The polymerization may be conducted in the presence or absence of air. In most cases, however, it has been found desirable to conduct the polymerization in the absence of air, e.g., in the presence of an inert gas such as nitrogen. Atmospheric, reduced or superatmospheric pressures may be employed. At the end of the polymerization, the unreacted monomer and solvents are removed by any suitable means, such as distillation, extraction and the like.

The synergistic wax crystal modifier composition of this invention comprises from about 1 to about 99 wt. percent by weight of the aforedescribed Friedel-Crafts condensation product and from about 99 to about 1 wt. percent of the aforedescribed polyalkylethylene oxide. Particularly preferred proportions are admixtures comprising from about 40 to about 60 wt. percent of the Friedel-Crafts condensation product and from about 60 to about 40 wt. percent of the polyalkylethylene oxide polymer.

The wax crystal modifier composition may be used in a number of petroleum dewaxing operations such as, for example, the conventional solvent dewaxing processes. It has been found that in these dewaxing operations, the removal of precipitated wax from a petroleum oil can be substantially improved by the incorporation of from about 0.001 to about 5 wt. percent, preferably from 0.01 to 1.0 wt. percent (based on weight of wax-containing petroleum oil) of either the synergistic wax crystal modifier composition or the alkylethylene oxide polymer prior to the precipitation of the wax from the oil.

While the products of this invention may be utilized to separate wax from a number of petroleum stocks, such as residua, middle distillates and the like, it has special application to waxy lubricating oil fractions. These fractions generally range in boiling points from about 400° to about 900° F. and contain from about 5 to about 20 wt. percent wax.

Various methods may be used to effect the blending of the wax crystal modifier composition, the wax-containing oil, and the dewaxing solvent, where used. For example, the wax crystal modifier composition and the wax-containing petroleum oil may be combined prior to the addition of a dewaxing solvent or alternately, the dewaxing solvent can be admixed with the oil prior to the addition of the wax crystal modifier. Broadly, an admixing temperature of about 120° F. to about 250° F. may be used. It is preferred, however, that the temperature be from about 160° F. to about 200° F.

The wax crystal modifier composition of this invention is found to be compatible with other additive materials and may be blended successfully with petroleum oils containing minor amounts of viscosity index improvers, rust inhibitors, lubricity agents, oxidation inhibitors and the like.

The invention can be more fully understood by reference to the following examples.

EXAMPLE 1

This example illustrates the preparation of a mixture of $C_{22}$–$C_{44+}$ epoxy alkanes from an alpha olefin feed having the composition and properties as shown in Table I.

Table I.—Characterization of alpha-olefin feed mixture (Average molecular weight, 360)

CARBON DISTRIBUTION [1]

| Number of carbon atoms: | Wt. percent |
| --- | --- |
| 22 | 25.8 |
| 24 | 18.9 |
| 26 | 14.1 |
| 28 | 10.4 |
| 30 | 7.9 |
| 32 | 5.7 |
| 34 | 4.1 |
| 36 | 2.8 |
| 38 | 2.2 |
| 40 | 1.6 |
| 42 | 0.9 |
| 44+ | 5.6 |

[1] Chromatographic analysis.

170 grams of the alpha-olefin feed mixture was dissolved in 2.3 liters of methylene chloride and to this was added at 25° C. a mixture of 102 grams of metachloroperbenzoic acid and 1.0 liter of methylene chloride over a period of about 1½ hours. After the addition of the metachloroperbenzoic acid, reaction was continued at about 25° C. for a period of about 16 hours, or until a negative test was obtained with starch-iodide test paper.

The epoxide product was purified and recovered by filtering off the unreacted metachloroperbenzoic acid, washing with 5% sodium bicarbonate solution and water, removing the aqueous layer, drying over sodium sulfate and by stripping off the solvent at ambient temperature and 2 mm. Hg.

EXAMPLE 2

A polymer of $C_{20}$–$C_{42+}$ alkylethylene oxide was prepared as follows: 20 grams of the epoxide produced from Example 1 and 40 ml. of n-pentane were charged into a stirred 100 ml. flask and to this was added dropwise over three minutes an admixture of 1 ml. of boron trichloride etherate and 5 ml. of ethyl ether. The polymerization was continued for a period of about an hour at a temperature of about 22° C. Polymerization was then terminated by the addition of about 20 ml. of water and the polymer product was isolated by distilling off the unreacted materials at elevated temperatures and reduced pressures. The resulting product was an amber colored, waxy solid having a number average molecular weight of about 1,895.

EXAMPLE 3

The following example illustrates the synergistic effect between a conventional Friedel-Crafts condensate (i.e., a condensation product of 4 moles of chlorinated 170° F. M.P. wax containing 12 wt. percent chlorine with one mole of naphthalene) and the $C_{20}$–$C_{42+}$ alkylethylene oxide polymer prepared in Example 2. In addition, it is shown herein that the alkylethylene oxide polymer is an effective dewaxing aid in its own right and, while not as potent as the synergistic mixture, its use affords a substantial improvement in wax separation.

In this example, 0.025 wt. percent (based on weight of wax-containing oil) of the above wax-naphthalene condensate and 0.025 wt. percent (based on weight of wax-containing oil) of the above polyalkylethylene oxide product were admixed at 145° F. with a waxy lube oil having the properties shown in Table II and hereinafter referred to as test oil.

Table II.—Properties of test oil [1]

| Inspection: | |
| --- | --- |
| ASTM viscosity at 210° F., SUS | 135 |
| Boiling point range, ° F. | 400–900 |
| ASTM pour point, ° F. | 145 |
| ASTM gravity, ° API 60/60° F. | 27.1 |
| Wax content | 12 |

[1] Baton Rouge Bright Stock from East Mississippi crude.

The above additive composition-tes oil blend was dewaxed in a conventional solvent dewaxing process, i.e., the additive-oil blend was dewaxed by diluting with hexane at a hexane/oil ratio of 3.5/1 and then chilling at the rate of 2° F. per minute from a feed temperature of 145° F. to a filter temperature of −30° F. The chilled mixture was then continuously filtered through a pressure leaf filter at a pressure differential of 20 inches of mercury. The filtration cycle consisted of a filtration time of 36 seconds, a drying time of 9 seconds, a wash time of 27 seconds and a second drying time of 18 seconds.

Other samples of the test oil were dewaxed in the same manner as above except that 0.05 wt. percent (based on weight of wax-containing oil) of each of the individual components of the dewaxing aid admixture was added to a separate oil sample prior to chilling. The feed mixtures comprising 0.05 wt. percent of the individual dewaxing aids (i.e., wax-naphthalene condensate or the polyalkylethylene oxide product) were then separately processed under the same dewaxing conditions as used in the aforedescribed operation wherein the synergistic dewaxing aid admixture was used.

The data obtained from the above respective dewaxing operations were shown in Table III.

Table III.—Dewaxing a waxy lube oil [1]

Dewaxing aid used: Filtration rate, gal./hr. ft.$^2$
None _____ 8.8
0.05 wt. percent of wax-naphthalene condensate _____ 14.7
0.05 wt. percent of alkylethylene oxide polymer _____ 16.9
0.05 wt. percent of 50/50 mixture of wax-naphthalene condensate/alkylethylene oxide polymer _____ 19.1

[1] Test oil of Table II.

From the data in Table III, the synergistic effect provided by the combination of the wax-naphthalene condensate with the $C_{20}$–$C_{42+}$ alkylethylene oxide polymer of Example 2 is evident. Thus, the combination of the additive components of this invention impart an improvement which is greater than that which could be obtained by the use of an equivalent weight amount of either material alone.

It is not intended that this invention be limited to the specific examples presented by way of illustration. The scope of the invention is limited only by the appended claims.

What is claimed is:
1. A composition comprising (a) a Friedel-Crafts condensation product of a halogenated paraffin with an aromatic hydrocarbon and (b) an oil-soluble polymer of a 1,2-epoxy alkane, represented by the general formula:

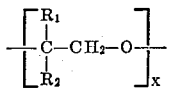

wherein X is an integer from 2 to 100, $R_1$ is selected from the group consisting of a lower alkyl and hydrogen, and $R_2$ is a hydrocarbon radical containing a substantially linear alkyl of at least 12 carbon atoms.

2. A composition according to claim 1 wherein $R_1$ is hydrogen, $R_2$ is a $C_{16}$–$C_{50}$ alkyl and X is within the range between 2 and 100.

3. A composition according to claim 2 wherein said aromatic hydrocarbon is naphthalene and said halogenated paraffin is chlorinated wax.

4. A composition comprising a major proportion of a wax-containing petroleum oil and a wax-modifying effective amount of a synergistic mixture containing (a) a Friedel-Crafts condensation product of a halogenated paraffin with an aromatic hydrocarbon and (b) oil-soluble polymer of a 1,2-epoxy alkane, represented by the general formula:

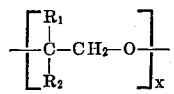

wherein X is an integer from 2 to 100, $R_1$ is selected from the group consisting of a lower alkyl and hydrogen, and $R_2$ is a hydrocarbon radical containing a substantially linear alkyl of at least 12 carbon atoms.

5. A composition according to claim 4 wherein $R_1$ is hydrogen, $R_2$ is a $C_{16}$–$C_{50}$ alkyl and X is within the range between 2 and 100.

6. A composition according to claim 5 wherein said aromatic hydrocarbon is naphthalene and said halogenated paraffin is chlorinated wax.

7. A composition according to claim 6 wherein $R_2$ is a $C_{16}$–$C_{26}$ alkyl.

8. In the process for the separation of wax from petroleum oils by the steps which include chilling the oil to form solid crystals and removing said wax crystals; the improvement of incorporating into said oil prior to formation of said wax crystals, a dewaxing aid composition comprising a synergistic mixture containing (a) a Friedel-Crafts condensation product of a halogenated paraffin with an aromatic hydrocarbon and (b) an oil soluble polymer of a $C_{14}$–$C_{50}$ 1,2-epoxy alkane.

9. A process according to claim 8 wherein said aromatic hydrocarbon is naphthalene and said halogenated paraffin is chlorinated wax.

References Cited
UNITED STATES PATENTS 2,457,328  12/1948  Swern et al. _____ 252—52
3,030,316  4/1962   Bailey _____ 260—615
3,108,944  10/1963  Stoller _____ 208—33
3,245,766  4/1966   Lifson et al. _____ 44—62

PATRICK P. GARVIN, *Primary Examiner.*

P. E. KONOPKA, *Assistant Examiner.*

U.S. Cl. X.R.

208—31, 33, 38; 252—52; 44—62; 260—615